Aug. 15, 1944.  J. M. TYLER  2,355,829
COWL SUPPORT
Filed Jan. 18, 1941  2 Sheets-Sheet 1

INVENTOR
John M. Tyler
BY
Harris G. Luther
ATTORNEY

Aug. 15, 1944.   J. M. TYLER   2,355,829
COWL SUPPORT
Filed Jan. 18, 1941   2 Sheets-Sheet 2
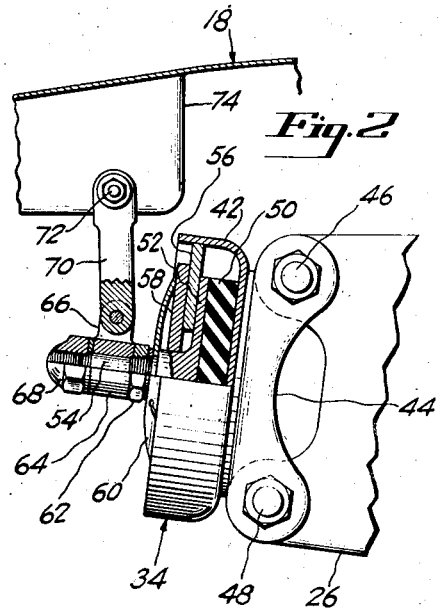
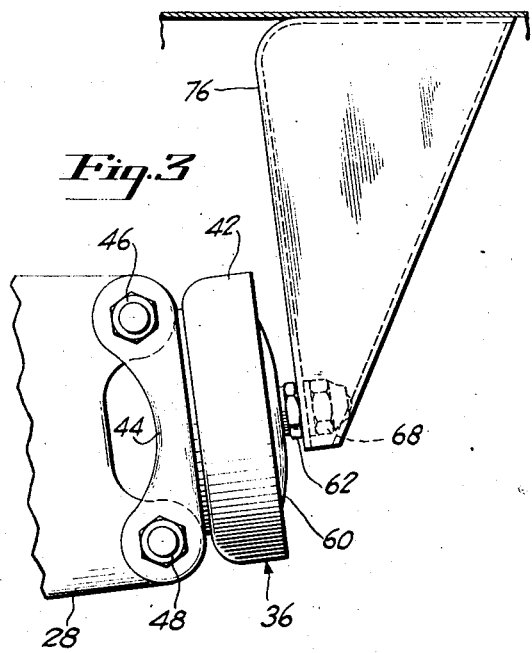
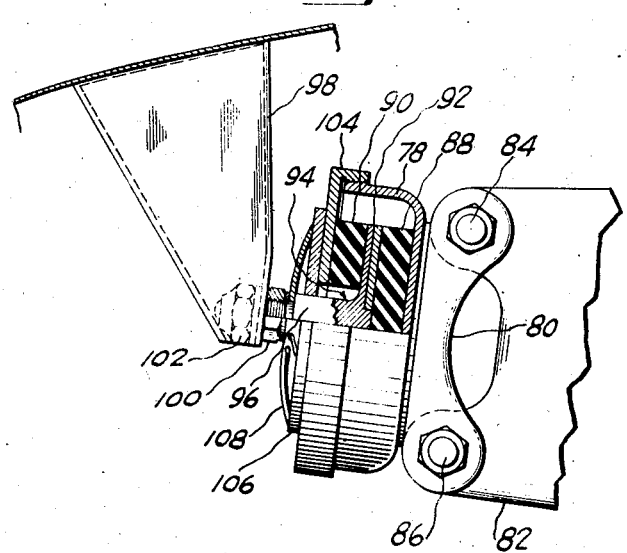
INVENTOR
John M. Tyler
BY
Harris G. Luther
ATTORNEY Patented Aug. 15, 1944

2,355,829

UNITED STATES PATENT OFFICE 2,355,829

COWL SUPPORT

John M. Tyler, West Hartford, Conn., assignor to United Aircraft Corporation, East Hartford, Conn., a corporation of Delaware Application January 18, 1941, Serial No. 374,974

10 Claims. (Cl. 244—53)

This invention relates to improved means for supporting an engine enclosure and has particular reference to an improved support for the cowling of an aircraft engine.

An object of the invention resides in the provision of an improved engine enclosure support which will maintain the enclosure in position relative to the engine and at the same time will suppress resonant vibrations of the enclosure with respect to the engine.

A further object resides in the provision of an improved engine enclosure support of the character indicated which will support the enclosure on the engine by elements which transmit loads transverse to the engine axis substantially radially of the engine in shear and loads longitudinally of the engine axis in compression of the elements.

A somewhat more specific object resides in the provision of improved means for attaching an engine cowl to attachment points on a radial internal-combustion engine of the character conventionally employed for the propulsion of aircraft.

Other objects and advantages will be more particularly pointed out hereinafter or will become apparent as the description proceeds.

In the accompanying drawings, in which like reference numerals are used to designate similar parts throughout, there is illustrated a suitable mechanical arrangement for the purpose of disclosing the invention. The drawings, however, are for the purpose of illustration only and are not to be taken as limiting or restricting the invention since it will be apparent to those skilled in the art that various changes in the illustrated construction may be resorted to without in any way exceeding the scope of the invention.

While the improved engine enclosure mount may be used in any installation to which its principles are applicable without in any way exceeding the scope of the invention, it has been particularly illustrated in combination with a radial aircraft engine and a streamlined cowl enclosing such an engine.

The proper mounting of a cowl on a radial aircraft engine must fulfill several requirements among which are the following:

Such a mounting must permit expansion of the engine due to the increase in engine temperature from the cold condition to the operating temperature without changing the shape or size of the cowl or subjecting it to appreciable stress.

It must withstand the large forwardly directed load imposed on the cowl by aerodynamic forces when the aircraft carrying the engine and cowl is in flight. This force is relatively large and in a typical case may amount to several thousand pounds.

In general the cowl mounting should have a stiffness and geometry such that it will transmit the cowl supporting forces between the engine and the cowl and will maintain the cowl against undesirable movement relative to the engine but will not facilitate the excitation of the cowl at any of its natural frequencies by the major engine vibrations.

It is practically impossible to mount a cowl on a radial aircraft engine so that all resonance conditions are avoided, particularly if a wide range of operating speeds of the engine is required. The cowl mounting should, therefore, introduce a damping effect between the engine and the cowl so that any resonant vibrations excited in the cowl by engine vibrations will not reach such amplitudes as to cause failures in the cowl or its mounting structure.

While the protection of the cowl against vibration which otherwise might be destructive to the cowl, its mounting and the engine at the attachment points of the cowl mounting is the primary object of this invention, another use for the cowl is made possible by the introduction of damping into the cowl mounting. In cases where the engine vibration may be destructive to accessories or other appendages attached to the engine the damped cowl mounting can be used to suppress the resonant vibrations of the engine itself. To obtain this result the stiffness of the cowl mounting must be adjusted to bring the natural frequency of the cowl in a mode corresponding to the mode of engine vibration to be suppressed close to the natural frequency of the engine system. To obtain maximum suppression of the vibration of the engine the ratio of the natural frequency of the cowl with respect to the natural frequency of the engine system ($F_R$), is related to the ratio of the moment of inertia of the cowl to the moment of inertia of the engine ($I_R$), as follows:

$$F_R = \left(\frac{1}{1+I_R}\right)$$

To obtain maximum suppression of the vibration of the engine the damping coefficient must also be adjusted to an optimum value which will be a function of $F_R$ and $I_R$. The relation between the damping coefficient of $F_R$ and $I_R$ cannot be stated as simply as the one above particularly when coulomb damping is employed in the cowl mount. However, the optimum damping can be determined analytically or experimentally by methods well known to those skilled in the art of vibration suppression.

In the case of those engines in which the cowl mounting lugs are cast integrally with the forward or rearward face of the valve rocker arm housing and have a maximum dimension extending radially and a minimum dimension extending tangentially of the engine and are consequently most easily broken by forces extending tangentially of the engine, the cowl mounting should transmit the greater portion of the cowl securing loads to these lugs in a direction radially of the engine.

It is among the objects of this invention to provide an improved cowl mount that will adequately fulfill all of these requirements.

In the drawings,

Fig. 2 is a partly sectional partly elevational view on an enlarged scale of one of the forwardly disposed cowl mount units shown in Fig. 1.

Fig. 3 is an elevational view on an enlarged scale of one of the rearwardly disposed mount units shown in Fig. 1, and Fig. 4 is a partly sectional partly elevational view of a unit adapted to support a cowl on a single-row engine in which case but one row of support units would be utilized.

Figure 1:
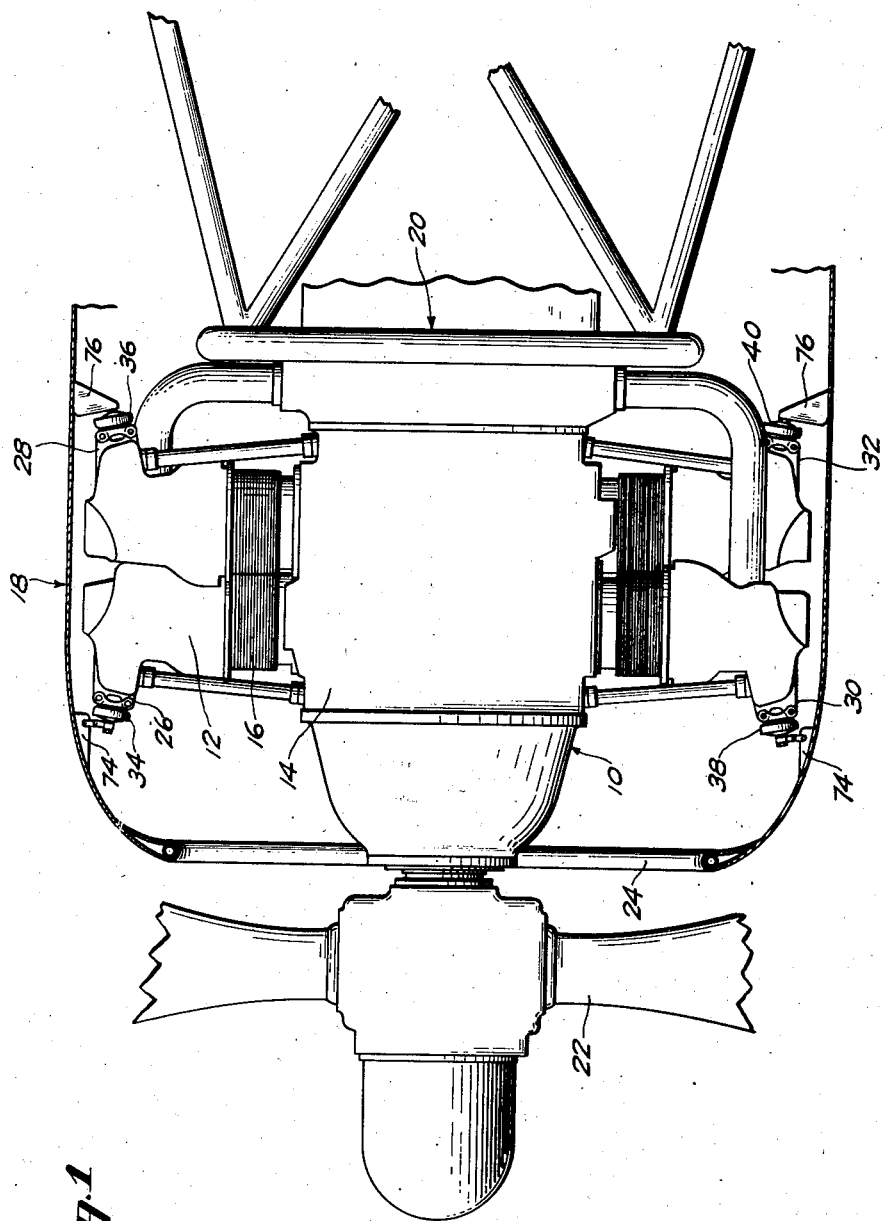
Fig. 1 is a longitudinal sectional view through an engine cowl schematically showing an engine in elevation and the application of the cowl supporting arrangement of the invention thereto.

Referring to the drawings in detail and particularly to Fig. 1, the numeral 10 generally indicates an engine having a plurality of cylinders 12 mounted upon a crankcase 14. In the engine illustrated two rows of cylinders are mounted radially about the crankcase to constitute a two-row radial engine and the cylinders are provided with cooling surfaces, as indicated at 16, for the transfer of excess heat to a stream of cooling air flowing past the engine through the streamlined cowl generally indicated at 18. The engine may be mounted on a suitable support 20 attached to a structural portion of an airplane and may carry an aeronautical propeller 22. In the case of an air-cooled engine, such as that illustrated, the cowl may be provided with a front opening 24 for the entrance of cooling air and with a rear opening, not illustrated, but of some form well known to the art.

The cowl illustrated is an annular member of generally stream-lined form closely surrounding the radial engine 10 but slightly spaced from the outer ends of the engine cylinder heads 12 so that the cowl will not at any time come into direct contact with any portion of the engine.

Each engine cylinder or selected cylinders are provided with attachment points, as indicated at 26, 28, 30 and 32 in Fig. 1, projecting laterally from the outer portions of the cylinder heads 12 and, in the form illustrated, providing a pair of apertured lugs integral with a narrow pad cast onto the valve rocker arm bearings and disposed radially of the engine. To each of these attachment points there is connected a resilient bracket member, as indicated at 34, 36, 38 and 40 in Fig. 1, which are also connected to attachment members secured to the interior of the cowl 18.

While the embodiment of the invention illustrated in Fig. 1 shows but two forward and two rearward cowl attachment devices, it is to be understood that any desired number of these devices may be disposed circumferentially about the interior of the cowl and connected to selected engine cylinders. While two rows of attachment members have been illustrated in connection with the two-row engine shown in Fig. 1, it is also to be understood that the cowl can be satisfactorily supported by a single row of attachment members and that only one row of such members would normally be used in supporting the cowl of a single-row engine. The improved resilient unit may also be used to support the enclosures of other types of engines such as in-line or opposed types and may be connected either between an engine and its enclosure or between the engine support or some other structural part of the aircraft and the engine enclosure.

As all of the front row units are identical and all of the rear row units are identical in the arrangement illustrated it is considered sufficient for the purpose of this disclosure to describe in detail only one unit of each row. For this purpose reference may be had to Fig. 2 which shows in detail a front row unit, such as the unit 34 mounted on the engine attachment lug 26, and to Fig. 3 which shows a rear row attachment unit, which may be the unit 36 mounted on the engine attachment lug 28.

The front row unit shown in Fig. 2 comprises a relatively shallow cup shaped member 42 of suitable metal having a fin or rib 44 integral with rigidly attached to the closed bottom thereof by suitable means such as welding or brazing. The member 44 is preferably a channel shaped member having two similar parallel projections provided with rounded apertured end portions, the apertures being so spaced as to correspond with the apertures in the engine carried attachment lug 26. In this suggested arrangement one part of the member 44 is disposed upon each side of the engine attachment lug and through bolts, as indicated at 46 and 48, are inserted through the registering apertures to securely attach the member 44 and cup 42 to the attachment lug 26. This positions the cup with its open end facing generally forward.

Within the cup 42 there is disposed a relatively fixed block 50 of resilient material such as partially vulcanized rubber. One surface of this block 50 may be bonded to the bottom of the cup 42 and the other surface may be bonded to the face of a plate 52 which is centrally provided with an integral threaded stem 54 extending out of the open end of the cup. An apertured member 56 is disposed within the cup surrounding the stem 54 with its inner surface bearing on the outer surface of the plate member 52. This member 56 is so dimensioned that its periphery fits closely but slidably within the annular portion of the cup 42 while its central aperture is larger than the stem 54 and the wall thereof is radially spaced from the stem in all directions. A second apertured member 58 is disposed within the cup so that its inner face bears on the outer race of the member 56. The member 58 is so dimensioned that its periphery is spaced from the interior surface of the annular portion of the cup while its central aperture closely fits the stem 54. A convex centrally apertured spring member 60 is positioned on the stem 54 so that its periphery contacts the peripherial portion of the outer surface of the member 58 and a nut 62 is screw threaded onto the stem 54 to bear against the central portion of the outer surface of the spring 60. When the nut 62 is screwed down the members 56 and 58 are placed in compression between the plate 52 and the spring 60 so that any relative movement between these members 56 and 58 will be resisted by friction incident to the pressure exerted on their contacting surfaces and on the contacting surfaces of the member 56 and plate 52. This construction provides a connection in which relative movement between the cowl and the engine in radial directions is resiliently resisted by the resilient block 50 in shear of the material thereof and is frictionally damped by the members 52, 56 and 58 so that these radially directed relative movements are resiliently accommodated by the mount units acting as relatively soft cushions and the amplitude of any cowl movement resulting from the transmission of a vibrational force through the units in a direction radial to the engine is kept down by the frictional damping means.

A collar 64 having at one side thereof a radially projecting apertured lug 66 is secured on the stem 54 by an end nut 68, the collar being securely clamped between the nuts 68 and 62. A link member 70 is pivotally secured to the lug 66 at its inner end and at its outer end is pivotally secured by suitable means such as the bolt or pin 72 to a bracket member 74 secured to the inner surface of the cowl 18 and projecting inwardly therefrom. This construction provides an arrangement in which radial loads between the engine and the cowl 18 are carried by the link 70 but the front mounting units are maintained free of longitudinal loads between the cowl and the engine. As the longitudinal forces between the engine and the cowl are usually such that the cowl tends to move forwardly with respect to the engine and, as such forces if resisted by the forward row of mount units would place the resilient blocks 50 in tension and tend to disrupt the bond between these blocks and the adjacent metal members, it has been found desirable to relieve the forward row of cowl mounting units from these longitudinal forces.

In the case of the rear unit, as exemplified by the unit 36, particularly as illustrated in Fig. 3, the open end of the cup member 42 faces rearwardly and the cowl bracket 76 is longer than the front bracket 74 and projects radially inward to a location beyond the corresponding stem of the rear unit and is apertured to receive the stem. The inner end of the bracket 76 is rigidly connected to the stem by being clamped between the nuts 62 and 68 and is also rigidly attached to the cowl so that longitudinal as well as radial forces are supported by the rearward row of mounting units. However, as the longitudinal forces tend to place the resilient blocks of the rearward units in compression no disadvantage is incurred in this respect.

Where only a single row of attachment units are utilized the unit is somewhat modified as shown in detail in Fig. 4. In this form of the device the cup member 78 is made somewhat deeper than the cup member 42 shown in Figs. 2 and 3 and is provided at its open end with external screw threads. The channel shaped projection 80 on the bottom of the cup member 78 is similar to that shown in Figs. 2 and 3 and is connected to the engine attachment lug 82 by through bolts 84 and 86 in the manner shown in Figs. 2 and 3 and described above. In this form of the device the cup member 78 contains two resilient blocks 88 and 90 disposed at opposite sides of the flat head 92 of the coupling member 94 which carries the stem 96 attached at its outer end to the cowl carried bracket 98 by the nuts 100 and 102 screw threaded onto the stem. A flanged cover plate 104 is threaded onto the cup member 78 and provided with a central aperture larger than the stem 96 through which the stem projects. The inner surface of this cover plate 104 bears against the outer surface of the resilient block 90 and an apertured plate 106, provided with a central aperture, closely fits the stem 96, surrounds the stem, and bears against the outer surface of the plate 104. This plate 106 is held in frictional contact with cover plate 104 by a convex spring 108 loaded by the nut 100. The resilient blocks 88 and 90 are preferably bonded to the head portion 92 of the member 94 but are not necessarily bonded to the cup 78 and cover plate 104 since the members may be dimensioned so that the cover plate will place the block under sufficient compression to retain them in proper position in the cup member at all times.

The spring members 60 and 108 are preferably formed of suitable resilient metal such as spring steel and are made in a partly spherical or conical shape and bear upon the respective friction plates to hold these plates in contact with the friction members which are fixed relative to the respective cup members and, in the case of the double row brackets, as illustrated in Figs. 2 and 3, these springs together with the rubber block 50 provide a slight resiliency in a fore and aft direction. Similar resiliency is provided by the blocks 88 and 90 in the form of the invention shown in Fig. 4. The brackets, however, are relatively stiff in this direction since any fore and aft movement of the cowl relative to the engine is resisted by the resilient blocks in compression. For this reason it is quite feasable to maintain the cowl in position on the engine with a single row of brackets since the brackets are disposed circumferentially around the interior of the cowl and the resilient blocks are sufficiently stiff in compression to restrain the cowl from any large movements relative to the engine even under the large forwardly directed force imposed on the cowl. While the resilient connecting members are relatively stiff when the resilient material is in compression this material is relatively flexible in shear so that relatively large movements of the cowl relative to the engine in both radial and circumferential directions are possible. The vibratory movements of the engine at frequencies involving cowl vibration with respect to the engine are mainly torsional. There are also vibrations of a nature involving combined pitching and yawing or whirl of the engine. This arrangement of cowl mounting provides a very soft cushion connection between the engine and the cowl in the circumferential direction in which the vibratory movements are the greatest, and the friction means will prevent the building up of the amplitude of relative movement between the cowl and the engine by any condition of resonance of the cowl with respect to the engine, so that the cowl will be supported in a steady and relatively vibrationless condition regardless of the vibrational movements of the engine or other structure upon which it is supported.

While, as explained above, the mounts are theoretically so proportioned that the radially and tangentially directed forces between the engine and the cowl will be transmitted through the mount units mainly in shear of the material of the resilient elements and the longitudinal forces will be transmitted mainly in compression of the resilient material, under these conditions the pitching and yawing movements of the cowl with respect to the engine will involve radial, tangential and longitudinal forces which will be transmitted in shear and compression of the resilient material. In the case of yawing or pitching movements of the engine, some of the units will transmit the resultant forces mainly in compression of the resilient material and others mainly in shear of the resilient material. In order to introduce a desired amount of shear resistance into all of the mounts when subjected to such yawing and pitching movements of the engine, the angle between the resilient pad faces and the engine axis may be modified in such a manner that the faces of the resilient pads have an angular position somewhere between that in which the faces are perpendicular to lines parallel to the engine axis and that in which they are perpendicular to lines passing through the neutral point within the engine about which such yawing and pitching movements of the engine take place.

While several suitable mechanical embodiments for disclosing the invention have been hereinabove described and illustrated in the accompanying drawings, it is to be understood that the invention is not limited to the particular embodiments so illustrated and described but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In aircraft having an engine including a plurality of radially disposed cylinders, the combination with a cowl surrounding said cylinders and subjected to radial and axial forces with respect to its longitudinal axis, of a cowl support structure including supporting elements having provision for attachment to certain of the engine cylinders and having supporting surfaces transverse to the longitudinal axis of said cowl, supporting elements carried by said cowl at locations corresponding to the cylinder supported elements and having supporting surfaces also transvere to said axis, and blocks of rubber having opposite faces thereof attached to adjacent supporting surfaces of corresponding cowl and engine supporting elements for absorbing torsional and radial forces largely in shear and fore and aft forces largely in compression of the material of said blocks.

2. In aircraft having an engine including a plurality of radially disposed cylinders, the combination with a cowl surrounding said cylinders and subjected to radial and axial forces with respect to its longitudinal axis, of a cowl support structure including supporting elements having provision for attachment to certain of the engine cylinders and having supporting surfaces transverse to the longitudinal axis of said cowl, supporting elements carried by said cowl at locations corresponding to said cylinder supported elements and having supporting surfaces also transverse to said axis, and blocks of rubber having opposite faces thereof attached to adjacent supporting surfaces of corresponding cowl and engine carried supporting elements for absorbing torsional and radial forces largely in shear and axial forces largely in compression of the material of said blocks, and cooperating means on said engine and cowl carried supporting elements for damping the relative movements between said cowl and the engine which place said rubber blocks in shear.

3. In combination, an engine enclosing cowl, and means carried by said cowl for supporting the latter on an engine including mounting units disposed at spaced distances around the wall of the cowl, each of said units including elements having provision for attachment respectively to the cowl and to an engine and having spaced confronting surfaces disposed transverse to the fore and aft axis of the cowl and a rubber block connecting said surfaces for absorbing fore and aft forces largely in compression and radial and torsional forces largely in shear of the material comprising said blocks.

4. In combination, an engine enclosing cowl, and means carried by said cowl for supporting the latter on an engine including mounting units disposed at spaced distances around the wall of the cowl, each of said units including elements having provisions for attachment respectively to the cowl and to an engine and having spaced confronting surfaces disposed transverse to the fore and aft axis of the cowl and a rubber block connecting said surfaces for absorbing fore and aft forces largely in compression and radial and torsional forces largely in shear of the material comprising said blocks, and cooperating means carried by said elements for damping relative movements of said elements which place said rubber blocks in shear.

5. In aircraft having a single-row radial engine, the combination with a cowl for enclosing the engine, of resilient means connecting the cowl with selected cylinders of the engine including a plurality of spaced mounts arranged in a single plane around the engine, each having spaced brackets connected to said cowl and engine respectively and a rubber block connecting said brackets, and frictional damping means including cooperating frictionally engaging members each movable with a different bracket for damping movements of said brackets which place said rubber blocks in shear.

6. In aircraft having an engine including front and rear rows of radially disposed cylinders, the combination with a cowl enclosing the engine and subjected to radial and axial forces with respect to its longitudinal axis, of a cowl support structure including front and rear sets of resilient mounts disposed at spaced points along said cowl axis adjacent said front and rear rows of cylinders, each mount of said front set including a bracket member having means for securing it to an engine cylinder at the front row and also having a forwardly directed surface, a cooperating bracket member having a connection to said cowl permitting unrestrained axial movement of said mount relative to said cowl, said cooperating bracket having a rearwardly directed surface, and means for resiliently connecting said brackets comprising a body of rubber-like material having opposite faces thereof secured to said forwardly and rearwardly directed surfaces, and each mount of said rear set including a bracket member having means for attaching it to an engine cylinder of the rear row and also having a rearwardly directed surface, and a cooperating bracket member having a rigid connection to said cowl and having a forwardly directed surface, and means for resiliently connecting said brackets comprising a body of rubber-like material having opposite faces thereof secured to said rearwardly and forwardly directed surfaces.

7. In aircraft having an engine including front and rear rows of radially disposed cylinders, the combination with a cowl enclosing the engine and subjected to radial and axial forces with respect to its longitudinal axis, of a cowl support structure including front and rear sets of resilient mounts disposed at spaced points along said cowl axis adjacent said front and rear rows of cylinders, each mount of said front set including a forwardly opening cup-shaped housing having means for securing it to an engine cylinder of the front row, a cooperating bracket member having a pivoted link connection to said cowl permitting unrestrained axial movement of said cowl relative to said mounts and also having a flange disposed within said housing, and a block of rubber having opposite faces thereof secured to confronting faces of said housing and flange, and each mount of said rear set including a rearwardly opening cup-shaped housing having means for attaching it to an engine cylinder of the rear row, and a cooperating bracket member having a rigid connection to said cowl and having a flange located in said housing, and a block of rubber having opposite faces thereof secured to confronting faces of said housing and flange.

8. In aircraft having an engine including cylinders certain of which are provided with attachment lugs, the combination with a cowl surrounding said cylinders and subjected to axial and radial forces with respect to its longitudinal axis and having inwardly directed attachment lugs corresponding in location to the cylinder lugs, of a plurality of resilient cowl mounting units disposed at said lug locations and connected to said cylinder and cowl lugs, certain of said units being rigidly connected with said cowl and others having flexible connections thereto.

9. In aircraft having an engine including cylinders certain of which are provided with attachment lugs, the combination with a cowl surrounding said cylinders and subjected to axial and radial forces with respect to its longitudinal axis and having inwardly directed attachment lugs corresponding in location to the cylinder lugs, of a plurality of resilient cowl mounting units disposed at said lug locations and connected to said cylinder and cowl lugs, certain of said units being rigidly connected with said cowl and others having flexible connections thereto, and each of said units including engine attached and cowl attached bracket members having confronting surfaces transverse to the longitudinal axis of said cowl, and a block of rubber having opposite faces thereof secured to said surfaces, whereby said cowl is resiliently secured to and around said engine, and axially directed forces are resisted in compression while radially and circumferentially directed forces are resisted in shear of the material comprising said blocks.

10. In aircraft having an engine including front and rear rows of radially disposed cylinders and cowl supporting lugs carried by certain cylinders of each row, the combination with a cowl enclosing said engine having sets of inwardly directed front and rear lugs corresponding in position to said engine carried lugs, of a plurality of resilient mounts disposed at the lug locations of said front row, each including a forwardly opening cup-shaped housing secured to an engine carried lug, a cooperating bracket member having a pivotal link connection to a corresponding cowl carried lug for permitting free axial movement of said cowl relative to said engine and also having a flange disposed in said housing, and a resilient block in said housing bonded to the confronting faces of said flange and housing, and a plurality of resilient mounts disposed at the lug location of said rear row of cylinders, each including a rearwardly opening cup-shaped housing secured to an engine carried lug, a cooperating bracket member rigidly connected to a corresponding cowl carried lug and having a flange in said housing, and a resilient block in said housing bonded to the confronting faces of said flange and housing, both said front and rear mounts having friction means controlling relative movement of said housing and bracket members in directions placing the material of said resilient blocks in shear, and the pivoted and rigid connections respectively of said front and rear mounts enabling absorption to axially directed forces in said rear mounts with the resilient blocks thereof in compression.

JOHN M. TYLER.